United States Patent
Griffin et al.

(10) Patent No.: US 7,179,036 B2
(45) Date of Patent: Feb. 20, 2007

(54) FASTENING ARRANGEMENT EMPLOYING THREAD-FORMING SCREW

(75) Inventors: David C. Griffin, Florence, SC (US); Thomas D. Kelly, Florence, SC (US)

(73) Assignee: The Esab Group, Inc., Florence, SC (US)

(*) Notice: Subject to any disclaimer, the term of this patent is extended or adjusted under 35 U.S.C. 154(b) by 67 days.

(21) Appl. No.: 10/939,645

(22) Filed: Sep. 13, 2004

(65) Prior Publication Data
US 2006/0056940 A1  Mar. 16, 2006

(51) Int. Cl.
*F16B 35/04* (2006.01)
*F16B 37/16* (2006.01)

(52) U.S. Cl. .................. 411/301; 411/416; 411/437
(58) Field of Classification Search ............ 411/301, 411/426, 349, 554, 350, 437, 551
See application file for complete search history.

(56) References Cited

U.S. PATENT DOCUMENTS

| | | | | |
|---|---|---|---|---|
| RE24,572 | E * | 12/1958 | Welles .................. 470/204 |
| 3,295,154 | A * | 1/1967 | Watson et al. ............. 470/18 |
| 3,842,877 | A * | 10/1974 | Andrews ................ 411/277 |
| 4,010,671 | A * | 3/1977 | Hubbard et al. ........... 411/422 |
| 4,040,328 | A | 8/1977 | Muenchinger |
| 4,067,256 | A * | 1/1978 | Turner ................... 411/437 |
| 4,069,730 | A | 1/1978 | Gutshall |
| 5,246,322 | A * | 9/1993 | Salice .................. 411/15 |
| 5,326,208 | A * | 7/1994 | Werner .................. 411/437 |
| 5,395,195 | A * | 3/1995 | Fulmer ................... 411/386 |
| 5,725,342 | A * | 3/1998 | Gehrer ................... 411/33 |
| 5,795,120 | A | 8/1998 | Hurdle |
| 5,964,560 | A | 10/1999 | Henriksen |
| 6,077,015 | A * | 6/2000 | Leibman ................ 411/418 |
| 6,540,462 | B1 * | 4/2003 | Bretschneider et al. ....... 411/82 |
| 6,935,636 | B2 * | 8/2005 | Bobst ................... 279/8 |

FOREIGN PATENT DOCUMENTS

| | | |
|---|---|---|
| EP | 1 635 077 | 3/2006 |
| FR | 2 086 804 | 12/1971 |
| FR | 2 780 906 | 1/2000 |
| GB | 922 992 | 4/1963 |
| GB | 1 071 549 | 6/1967 |

OTHER PUBLICATIONS

The European Search Report for European Application No. 05019781.3; Sep. 12, 2005; Date of Completion Nov. 22, 2005.

* cited by examiner

*Primary Examiner*—Flemming Saether
(74) *Attorney, Agent, or Firm*—Alston & Bird LLP

(57) ABSTRACT

A fastening arrangement comprising a thread-forming lobular screw and a member defining a non-tapped pilot hole therein. The screw has a shaft and a head joined to a proximal end of the shaft, the shaft defining a plurality N of lobes circumferentially spaced about a central longitudinal axis of the shaft, a thread being formed on an outer surface of the shaft. The pilot hole comprises a central portion of a diameter intermediate the minor and major diameters of the screw thread, and a plurality N of circumferentially spaced cutouts extending radially out from the central portion. A plurality of longitudinally extending edges parallel to the axis of the screw are defined at junctures between the cutouts and central portion of the pilot hole. The screw thread forms a thread in the member beginning at the longitudinal edges of the pilot hole.

12 Claims, 2 Drawing Sheets

FASTENING ARRANGEMENT EMPLOYING THREAD-FORMING SCREW

BACKGROUND OF THE INVENTION

The invention relates to a fastening arrangement for fastening a component to a another member using a thread-forming screw.

In harsh environments, stainless steel panels are often used as structural components, housings, and the like, to minimize corrosion problems. It is frequently necessary to mount various components to such panels, or to fasten two or more such panels together, using threaded fasteners such as screws. Desirably, thread-forming or self-tapping screws would be used in such circumstances so that tapped pilot holes would not have to be formed in the panels. However, thread-forming screws are generally made of mild steel or the like, and stainless steel is substantially harder than mild steel. Generally, a thread must be created using a harder material to cut or form the thread; commonly available fasteners are not harder than stainless steel.

With most thread-forming fasteners, the thread formation starts on the circular edge of the pilot hole that lies in a plane normal to the axis of the screw (i.e., the edge defined by the intersection between the cylindrical inner surface of the hole and the planar outer surface of the panel). The thread of the fastener is at a shallow angle to this circular edge. For a thread-forming fastener to work, the thread must remain largely intact after breaking into this edge. Generally, on stainless steel the soft thread is damaged on this edge and is unable to pass through it.

The shallow angle between the fastener thread and the edge of the hole, and the limited ability of the screw to form the harder material, make it very difficult to form threads in stainless steel.

As a result of the difficulties of using thread-forming fasteners in stainless steel, it is typically necessary to use an alternative approach to fasten items to stainless steel panels. For instance, threaded inserts, rivet-nuts, weld nuts, and clip-in nuts are common solutions. Unfortunately, each of these solutions adds additional parts and operations, ultimately increasing product cost.

BRIEF SUMMARY OF THE INVENTION

The invention addresses the above needs and achieves other advantages, by providing a means by which thread-forming screws can be used in a member that is as hard as or harder than the screw. The invention thus does not require additional parts such as threaded inserts, rivet-nuts, weld nuts, clip-in nuts, or the like, in order to fasten a component to the member. Surprisingly, it has been found that a thread-forming screw can form threads in a member of a material as hard as or even harder than the material of the screw, by using a screw of particular configuration and by suitably configuring the pilot hole into which the thread-forming screw is screwed.

In accordance with one embodiment of the invention, a fastening arrangement is provided, comprising a thread-forming lobular screw and a member defining a non-tapped pilot hole therein. The screw has a shaft and a head joined to a proximal end of the shaft, the shaft defining a plurality N of lobes circumferentially spaced about a central longitudinal axis of the shaft, a thread being formed on an outer surface of the shaft. The thread defines a major diameter at a crest of the thread and a minor diameter at a root of the thread, and the thread diameters are maximum at each lobe and diminish between the lobes. The pilot hole comprises a central portion of a diameter intermediate the minor and major diameters and a plurality N of circumferentially spaced cutouts extending radially out from the central portion. A plurality of edges are defined at junctures between the cutouts and central portion of the pilot hole, the edges extending generally parallel to the longitudinal axis of the screw shaft. Turning of the screw in the pilot hole causes the thread on the lobes to plastically deform the member beginning at the edges of the pilot hole so as to form a thread in the pilot hole.

Thus, in contrast with the conventional approach to using thread-forming screws wherein the thread attempts to break into the material of the member at a very shallow angle defined between the thread and the circular edge of the hole as previously noted, in accordance with the invention, the thread forms a nearly perpendicular angle with respect to the edges defined by the junctures between the cutouts and the central portion of the pilot hole. As a result, the forces on the thread are much closer to being aligned along the helical direction of the thread, rather than being directed laterally against the thread flank as in the prior art. Thus, the thread is much better-supported and is able to plastically deform the material of the member beginning at the edges of the pilot hole, even when the member material is as hard as or harder than that of the screw. For instance, the screw can comprise a carbon steel while the member can comprise stainless steel. Alternatively, the screw can comprise a relative softer polymer while the member is a relatively harder polymer.

A significant advantage of the invention is that the thread can be formed in the member without the generation of shavings. Although not wishing to be bound by theory, it is believed that the material of the member that is deformed by the screw thread is able to flow into the cutouts, thereby reducing the stresses on the member and screw, such that shavings tend not to be generated. This is especially important when the member is an electrically conductive metal, since metal shavings can cause electrical short circuits or arcing in electrical devices.

The number of lobes and cutouts, N, can be 2, 3, 4, or even greater, although 2- and 3-lobed embodiments are preferred. In an alternative embodiment of the invention, a fastening arrangement is provided generally as described above, except that the screw has a single lobe and the pilot hole correspondingly has a single cutout. Although such an embodiment is not expected to be as advantageous as the multiple-lobe, multiple-cutout embodiments, in some cases it may be adequate, particularly when the member is not harder than the screw.

The hole in the member can be a through-hole or a blind hole. When the hole is a through-hole, such as in a plate or sheet member, advantageously the depth of the hole (i.e., the thickness of the member) exceeds the pitch of the screw thread, and more preferably the depth exceeds about twice the pitch of the thread.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
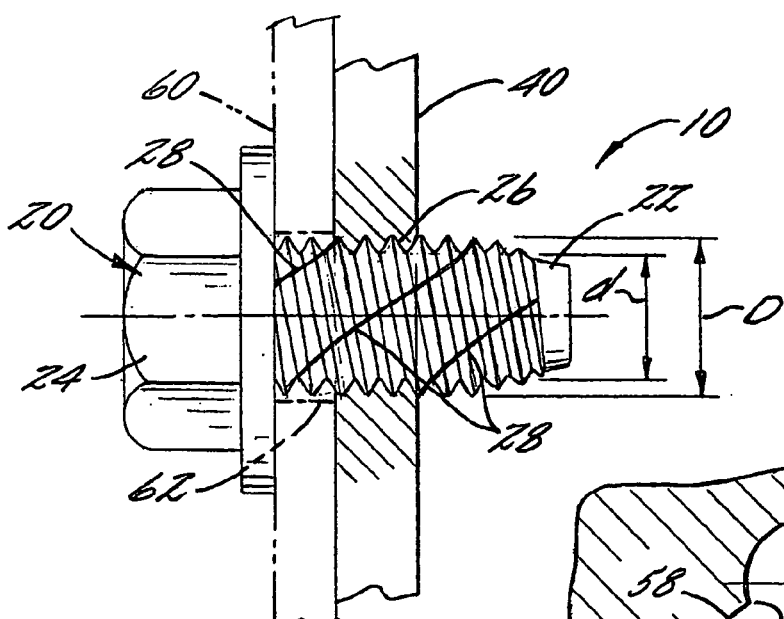
FIG. 1 is a side elevation of a fastening arrangement in accordance with one embodiment of the invention.
Figure 2:
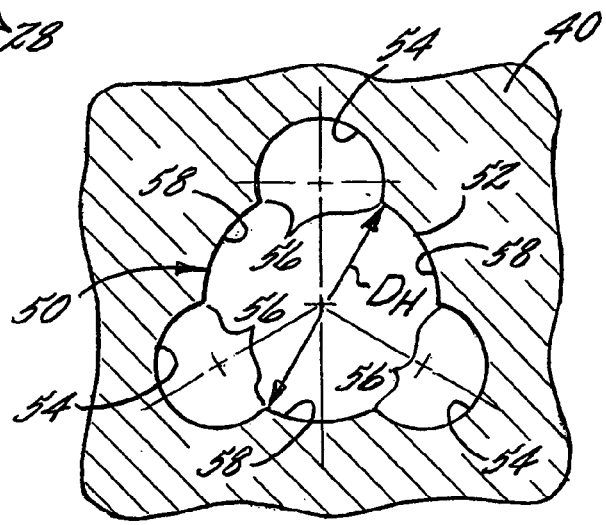
FIG. 2 is a cross-sectional view of the member of the fastening arrangement prior to insertion of the thread-forming screw.

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A fastening arrangement 10 in accordance with a first embodiment of the invention is depicted in FIGS. 1–4. The arrangement includes a lobular thread-forming screw 20 and a member 40 to which the screw is fastened by screwing the screw into a non-tapped pilot hole 50 formed in the member 40. The fastening arrangement is useful for securing one or more components 60 to the member 40 by passing the screw 20 through an aperture 62 in each component and capturing the component between the member 40 and the head 24 of the screw.

Figure 3:
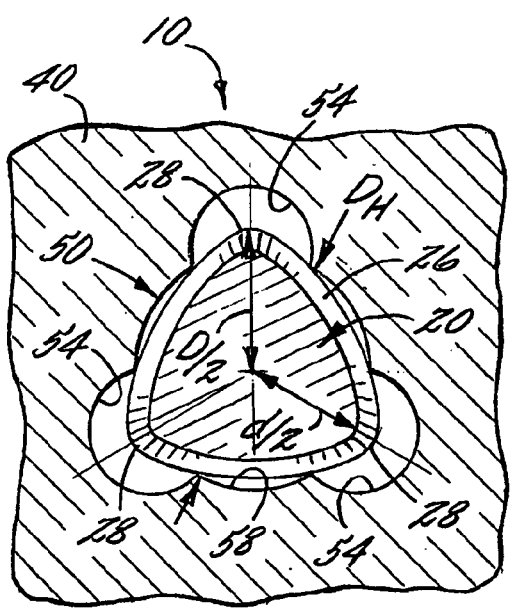
FIG. 3 is a schematic depiction of the fastening arrangement of FIG. 1, showing the screw as initially inserted into the pilot hole but prior to turning the screw to form threads in the member.
Figure 3A:
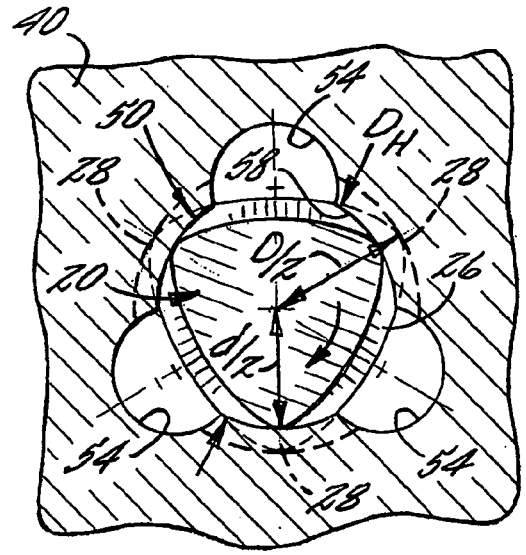
FIG. 3A is a view similar to FIG. 3, after the screw has been turned to form threads in the member.

The thread-forming screw 20 comprises a shaft 22 and a head 24 joined to a proximal end of the shaft. The head 24 can have various configurations for engagement with standard or non-standard drivers of various types. The shaft 22 has a helical thread 26 formed along its outer surface. As shown, the shaft has a tapered lead-in portion at the distal end of the shaft. The shaft 22 is lobular, defining three lobes 28 spaced uniformly about the circumference of the shaft. The thread 26 has a major diameter D at its crest and a minor diameter d at its root. The major diameter D varies about the shaft circumference, reaching a local maximum at each lobe 28 and diminishing between the lobes; likewise, the minor diameter d reaches a local maximum at each lobe and diminishes between the lobes, as best seen in FIG. 3. The diameters D, d also vary along the length of the shaft, gradually increasing along the tapered lead-in portion toward the head 24 and then remaining substantially uniform in the axial direction. The three lobes 28 extend helically along the shaft 22 in a helical direction having an opposite sense to the helical direction of the thread 26 (FIG. 1).

In conventional fastening arrangements employing lobular thread-forming screws, the screws are engaged in circular non-tapped pilot holes in the member to be fastened. Thread formation in the member must begin at the circular edge of the hole, i.e., the edge formed by the intersection of the member face perpendicular to the screw axis and the cylindrical inner surface of the hole. As can be appreciated, the angle between the helical direction of the screw thread and this circular edge of the hole is equal to the helix angle of the thread, which is typically a small value even for coarse-pitch screws. Consequently, the reaction force on the thread has a large component that is normal to the thread flank, and the thread is weakest in this direction. This does not cause a problem as long as the material of the screw is harder than that of the member into which the screw is inserted. However, when the member material is as hard as or harder than that of the screw, generally the thread is not able to withstand the large force component normal to its flank, and the thread becomes damaged or worn down and is not able to cut threads in the member.

Figure 4:
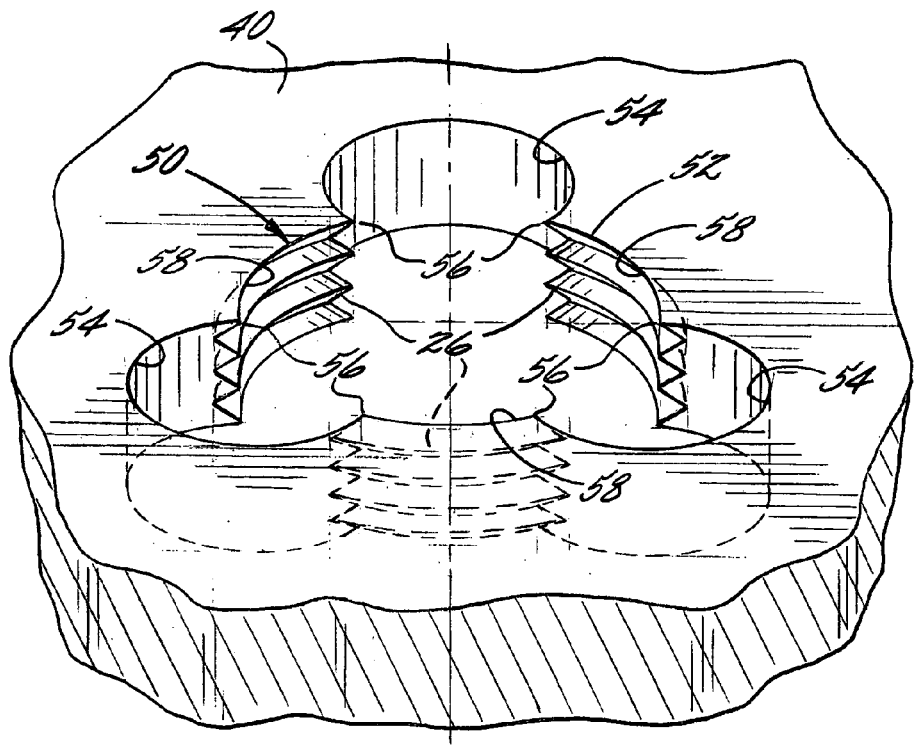
FIG. 4 is a perspective view of the member after thread formation, with the screw removed for clarity of illustration.

In accordance with the present invention, the pilot hole 50 in the member 40 is not entirely circular, but instead has a central circular portion 52 and a plurality of cutouts 54 that join with the central portion 52 and extend radially out therefrom. The number of cutouts 54 is the same as the number of lobes 28 on the screw 20. The circular central portion 52 has a diameter $D_H$ that is intermediate the major and minor diameters D and d at the screw lobes 28. The cutouts 54 extend out to a diameter that exceeds the major diameter D at the lobes. At junctures between the cutouts 54 and the circular central portion 52 of the pilot hole, edges 56 are defined in the pilot hole. The edges 56 extend substantially parallel to the central longitudinal axis of the pilot hole, and thus parallel to the screw axis. Accordingly, when the screw 20 is inserted into the pilot hole with the lobes 28 aligned with the cutouts 54 and the screw is then turned, the thread 26 on each lobe 28 encounters each of the edges 56. Advantageously the depth of the pilot hole should be at least about the pitch of the screw thread 26, and more preferably should substantially exceed the pitch (as illustrated in FIG. 4, for example), so that the thread 26 intersects the edges 56 rather than the edge of the hole at the end face of the member 40. As the screw is turned, the angle between the edges 56 and the helical direction of the thread 26 is 90 degrees minus the helix angle of the thread, and thus is close to perpendicular. As a result, the reaction force on the thread is substantially aligned with the helical direction of the thread, and there is only a very small component of force normal to the thread flank. The thread is therefore better able to withstand the force without being substantially deformed or damaged, and is able to begin cutting threads in the member 40 at the edges 56 in the pilot hole. Thread formation then continues along the circular-arc segments 58 of the central circular portion 52 of the pilot hole defined between the cutouts 54. Additionally, by providing a plurality of cutouts 54, and thus a plurality of edges 56 for thread-starting, the invention facilitates thread formation without substantial damage to the screw thread because there are effectively a plurality of starting threads (i.e., at least one for each edge 56), and hence the thread-forming reaction forces are distributed over a larger total thread surface area. Furthermore, when the depth of the pilot hole 50 exceeds about twice the pitch of the screw thread 26, there will generally be two starting threads for each edge 56, and hence six in total in the embodiment of FIGS. 1–4. FIG. 4 illustrates the two turns of the thread formed in the member when the thickness of the member exceeds twice the pitch.

In addition to allowing thread formation to begin at edges that are parallel to the screw axis, the cutouts 54 are believed to provide a volume into which material of the member 40 can flow as the material is plastically deformed by the screw 20. In this manner, the cutouts are believed to help relieve some of the stresses that would otherwise be exerted on the screw in the absence of cutouts.

Figure 5:
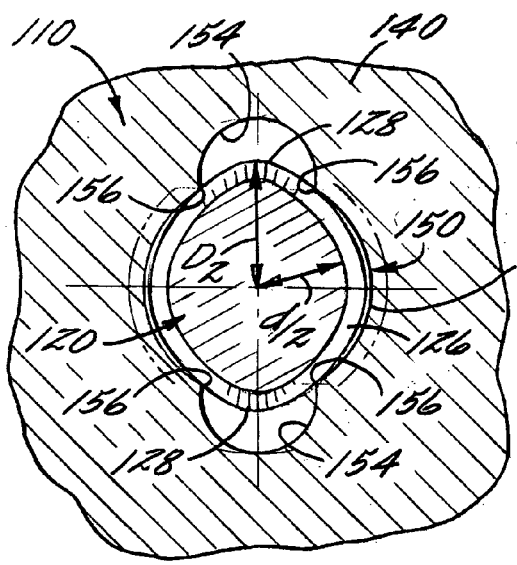
FIG. 5 shows another embodiment of the invention, employing a bilobular screw.

The invention is not limited to trilobular screws as described thus far. The number N of lobes and cutouts can be 1, 2, 3, 4, or even greater. For example, FIG. 5 illustrates a fastening arrangement 110 in accordance with an alternative embodiment of the invention employing a bilobular screw 120 having two lobes 128. The member 140 has a pilot hole 150 having two cutouts 154. The screw thread 126 forms threads in the member 140 beginning at the edges formed by the junctures between the cutouts 154 and the circular central portion 152 of the hole, as in the prior embodiment.

Figure 6:
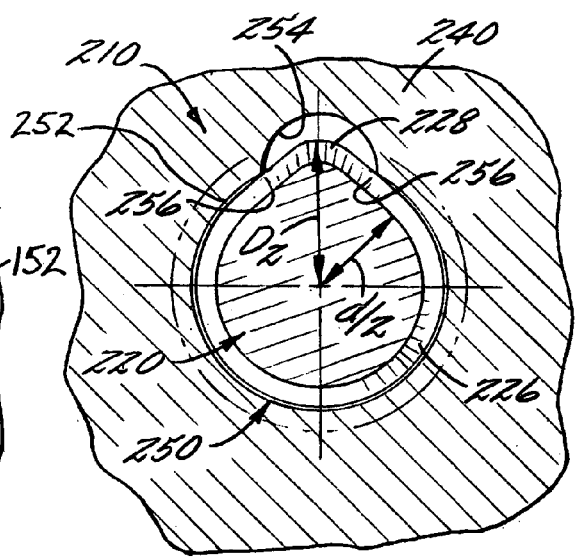
FIG. 6 shows yet another embodiment employing a unilobular screw.

FIG. 6 shows a fastening arrangement 210 having a unilobular screw 220 that has a single lobe 228. The pilot hole 250 in the member 240 correspondingly has a single cutout 254, although it will be recognized that a unilobular screw potentially could also be used in a pilot hole having two or more cutouts, if desired.

The screws 20, 120, 220 and the members 40, 140, 240 can be formed of various materials. As previously noted, one of the advantages of the invention is that the material of the screw need not be harder than that of the member. Thus, for example, the screw can comprise a low or medium carbon steel (e.g., SAE J429, Grade 2), which may have a coating of a different material (e.g., zinc/aluminum epoxy coating), while the member can comprise a harder steel such as stainless, or even a hard non-metallic material such as certain types of ceramic that have adequate ducility. Alternatively, the screw could be a non-metallic material such as a polymer (e.g., nylon), and the member could comprise a non-metallic material such as a polymer of the same or different type from that of the screw.

The members 40, 140, 240 can take on various forms and can be formed by various processes, as can the pilot holes 50, 150, 250 therein. For instance, the member can comprise a sheet or plate of metal, and the pilot hole can be formed through the entire thickness of the sheet or plate by punching, plasma discharge, water jet, laser, or other process. Alternatively, the member can be molded or cast of metal, polymer, ceramic, or other material, and the pilot hole can be formed during the molding or casting, as either a through-hole or a blind hole. The ability to employ non-tapped pilot holes, which are readily molded or cast, is another advantage of the invention.

The central portions 52, 152, 252 and cutouts 54, 154, 254 of the pilot holes can have various configurations. In the illustrated embodiments, the central portions are circular and the cutouts also comprise circles that partially overlap with the central portions. However, other shapes can be used, as long as the juncture between each cutout and the central portion defines a longitudinal edge for the screw thread to break into during thread-starting. It is advantageous for the longitudinal edge to be relatively sharp and thin, i.e., for the included angle between the two converging surfaces that come together at the edge to be not substantially greater than 120 degrees, and more preferably not substantially greater than about 90 degrees, but the invention is not limited to any particular angle.

It should also be noted that the drawings are not to scale. The cutouts 54, 154, 254 as illustrated are larger in size in relation to the central portion than they need to be, and the degree of "lobularity" of the screws is exaggerated, for clarity of illustration. The radial and circumferential extent of each cutout need only be sufficient to allow the maximum-diameter portion of the screw thread at each lobe to enter into the cutout upon initial insertion of the screw into the pilot hole.

In addition to the advantages of the invention that have already been noted, the fastening arrangement of the invention also has a self-locking function. Once a thread has been formed in the member, the torque required to turn the screw in the pilot hole varies during a complete rotation of the screw, as the lobes come into alignment and go out of alignment with the cutouts of the hole. As such, if torque is exerted on the screw during use tending to back the screw out of the hole, the screw might turn for a partial turn until the torque begins to rise again, but as long as the applied torque does not exceed the maximum, the screw will not further rotate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fastening arrangement, comprising:
   a thread-forming lobular screw having a shaft and a head joined to a proximal end of the shaft, a thread being formed on an outer surface of the shaft, the thread defining a major or diameter at a crest of the thread and a minor diameter at a root of the thread, the shaft defining a plurality N of lobes circumferentially spaced about a central longitudinal axis of the shaft, the major and minor diameters each reaching a local maximum at each of the lobes and diminishing between the lobes; and
   a member having a hardness at least as great as that of the screw and defining a non-tapped pilot hole therein, the pilot hole comprising a central portion having a diameter intermediate the major and minor diameters of the lobes, and a plurality N of circumferentially spaced cutouts extending radially out from the central portion, the pilot hole defining a plurality of longitudinal edges generally parallel to the axis of the screw shaft at junctures between the cutouts and central portion of the pilot hole, whereby turning of the screw in the pilot hole causes the thread on the lobes to plastically deform the member beginning at the longitudinal edges so as to form a thread in the pilot hole.

2. The fastening arrangement of claim 1, wherein the central portion of the pilot hole is circular.

3. The fastening arrangement of claim 1, wherein the screw has three lobes and the pilot hole has three cutouts such that there are three longitudinal edges of the pilot hole for thread-starting.

4. The fastening arrangement of claim 1, wherein the pilot hole has a depth exceeding a pitch of the thread.

5. The fastening arrangement of claim 1, wherein the pilot hole has a depth exceeding about twice a pitch of the thread.

6. The fastening arrangement of claim 1, wherein the shaft has a tapering lead-in portion at a distal end of the shaft.

7. A fastening arrangement, comprising:
   a thread-forming lobular screw having a shaft and a head joined to a proximal end of the shaft, a thread being formed on an outer surface of the shaft, the thread defining a major diameter at a crest of the thread and a minor diameter at a root of the thread, the shaft defining a lobe, the major and minor diameters each reaching a local maximum at the lobe and diminishing away from the lobe; and
   a member having a hardness at least as great as that of the screw and defining a non-tapped pilot hole therein, the pilot hole comprising a central portion having a diameter intermediate the major and minor diameters of the lobe, and a cutout extending radially out from the central portion, the pilot hole defining a longitudinal edge generally parallel to the axis of the screw shaft at a juncture between the cutout and central portion of the pilot hole, whereby turning of the screw in the pilot hole causes the thread on the lobe to plastically deform the member beginning at the longitudinal edge so as to form a thread in the pilot hole.

8. The fastening arrangement of claim 7, wherein the central portion of the pilot hole is circular.

9. The fastening arrangement of claim 7, wherein the pilot hole has a depth exceeding a pitch of the thread.

10. The fastening arrangement of claim 7, wherein the pilot hole has a depth exceeding about twice a pitch of the thread.

11. The fastening arrangement of claim 7, wherein the shaft has a tapering lead-in portion at a distal end of the shaft.

12. The fastening arrangement of claim 7, wherein the cutout has a periphery that is substantially circular arc-shaped.

* * * * *

UNITED STATES PATENT AND TRADEMARK OFFICE
CERTIFICATE OF CORRECTION

PATENT NO. : 7,179,036 B2
APPLICATION NO. : 10/939645
DATED : February 20, 2007
INVENTOR(S) : Griffin et al.

It is certified that error appears in the above-identified patent and that said Letters Patent is hereby corrected as shown below:

Column 6,

Line 23, after "major" cancel "or".

Signed and Sealed this

Eighth Day of May, 2007

JON W. DUDAS
*Director of the United States Patent and Trademark Office*